H. SCHUSTER.
APPARATUS FOR WHITENING AND AGING FLOUR.
APPLICATION FILED JUNE 22, 1908.
918,379.
Patented Apr. 13, 1909.
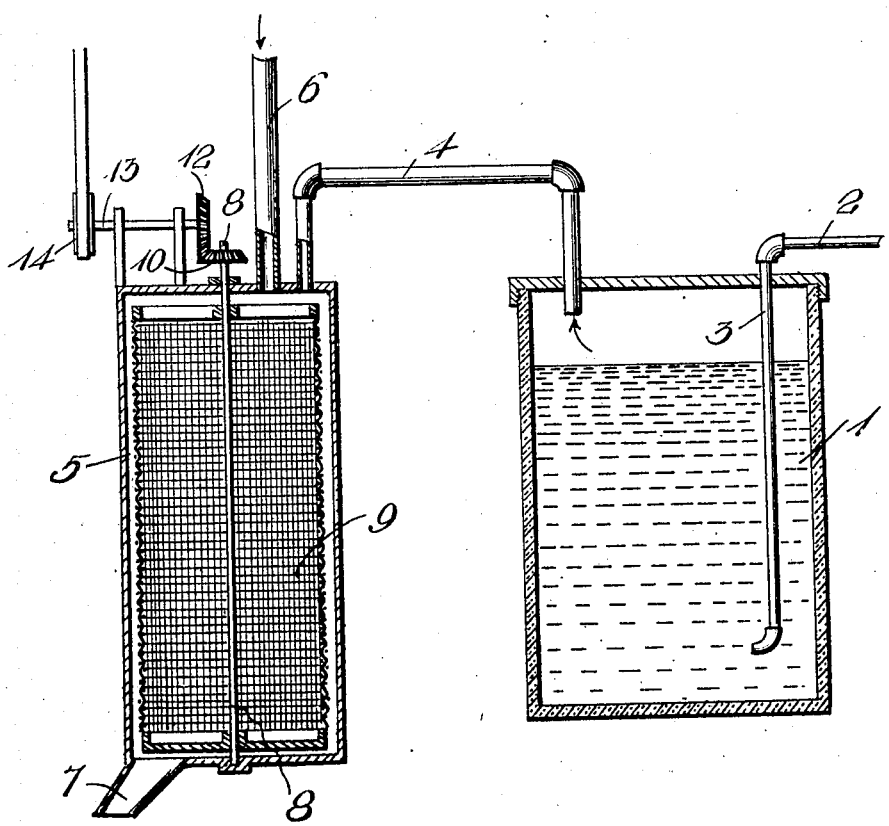
Witnesses
Inventor
Herman Schuster
By
Attorneys

UNITED STATES PATENT OFFICE.

HERMAN SCHUSTER, OF COLUMBUS, NEBRASKA.

APPARATUS FOR WHITENING AND AGING FLOUR.

No. 918,379.  Specification of Letters Patent.  Patented April 13, 1909.

Application filed June 22, 1908. Serial No. 439,819.

*To all whom it may concern:*

Be it known that I, HERMAN SCHUSTER, a citizen of the United States, residing at Columbus, in the county of Platte and State of Nebraska, have invented certain new and useful Improvements in Apparatus for Whitening and Aging Flour; and I do declare the following to be a full, clear, and exact description of the invention, such as will enable others skilled in the art to which it appertains to make and use the same.

This invention relates to an improved apparatus for whitening and aging flour.

The object of the invention is to produce a clear, colorless vapor having properties which, when brought into contact with the flour by means of my improved apparatus, will thoroughly whiten, age and improve the quality of the flour.

With these and other objects in view, the invention consists of certain novel features of construction, combination and arrangement of parts as will be described and particularly pointed out in the appended claim.

In the accompanying drawing is shown a diagrammatic sectional view of the apparatus for carrying out my improved process.

My improved process for whitening and aging flour consists in forcing air through a solution of pure nitric acid, thereby producing an oxid of nitrogen vapor, which is thoroughly mixed with the flour and by contact therewith whitens and ages the same.

In carrying out my invention and in order to produce the desired results therefrom I provide a closed tank or vessel, 1, of suitable size and preferably formed of glass. In the tank is placed the required quantity of pure nitric acid. Connected to the tank is an air conducting pipe, 2, the end of which extends down into the tank to near the bottom of the same, where it is formed with a reduced discharge tip through which the air is injected into the acid. The portion, 3, of the tube, 2, which extends into the tank is preferably formed of glass. Connected to the upper end of the tank is a discharge pipe, 4, through which the oxid of nitrogen vapor formed by the air when forced through the nitric acid passes to the mixing device which is provided to bring the vapor into thorough contact with the flour. The mixing device by which I carry out this mixing operation comprises a fixed cylinder, 5, closed at its opposite ends and having connected to its upper end a flour conducting tube, 6, and to its lower end a discharge spout, 7. Suitably mounted in the center of the cylinder, 5, is a longitudinally disposed shaft, 8, on which is fixed for rotation, a cylindrical screen, 9. On the upper end of the shaft, 8, is mounted a bevel gear, 10, which is engaged with a bevel gear, 12, on an operating shaft, 13, which is mounted in suitable bearings on the cylinder, 5, and is provided on its outer end with a band wheel, 14, by means of which the shaft is connected to a suitable driving mechanism, not shown.

In the operation of the device the flour is discharged into the upper end of the screen, 9, through the tube, 6, and the oxid of nitrogen is introduced into the upper end of the cylinder through the pipe, 4. The flour, after entering the screen, 9, is thrown or sifted through the same into the cylinder, 5, where it comes into contact with the oxid of nitrogen therein, which acts on the flour to produce the results hereinbefore described. The air is forced through the nitric acid in the tank 1 by means of an air pump or any other suitable device, not shown.

By producing a perfectly colorless vapor of the character described, the action thereof on the flour will be such as to bleach or whiten and age the same without in any manner affecting the good qualities of the flour.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

In an apparatus of the character described, a vertically disposed cylinder having in its lower end an offset discharge spout and at its upper end a top pierced adjacent its center by a flour supply tube, an operating shaft centrally mounted for revolution in said cylinder, a cylindrical screen fixed on said shaft, said screen having a closed lower end and being of such diameter as to form with the cylinder a narrow annular passage-way, an operating mechanism connected to the upper end of the shaft for rotating said screen in the cylinder whereby the flour is thoroughly agitated and projected into the annular passageway, and means to discharge a whitening and aging vapor or gas into said cylinder adjacent the flour inlet, said vapor being discharged simultaneously with the flour through the discharge spout whereby it is in contact and will be thoroughly mixed with the flour in all stages of its passage through the screen.

In testimony whereof I have hereunto set my hand in presence of two subscribing witnesses.

HERMAN SCHUSTER.

Witnesses:
 DANIEL SCHRAM,
 FRANK RORER.